Patented June 15, 1948

2,443,486

UNITED STATES PATENT OFFICE 2,443,486

PROCESS FOR MAKING NITROGEN SUBSTITUTED POLYAMIDES

William Way Watkins, Buffalo, N. Y., assignor to E. I. du Pont de Nemours & Company, Wilmington, Del., a corporation of Delaware No Drawing. Application December 30, 1943, Serial No. 516,282

4 Claims. (Cl. 260—72)

This invention relates to polymeric materials and more particularly to a process for obtaining N-methylol polyamides by reacting aldehydes with synthetic linear polyamides.

The polyamides from which these N-methylol polyamides are obtained are of the general type described in United States Patents 2,071,250, 2,071,253, and 2,130,948. The polyamides of this kind, also referred to as nylons, comprise the reaction product of a linear polymer-forming composition containing amide-forming groups. These may be obtained by self-polymerization of a monoaminomonocarboxylic acid, by reacting a diamine with a dibasic carboxylic acid in substantially equimolecular amounts, or by reacting a monoamiomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides are those having a unit length of at least 7, where unit length is defined in United States Patents 2,071,253 and 2,130,948.

The N-methylol derivatives of these polyamides obtained by reaction with aldehydes under proper conditions are N-methylol polyamides resulting from the substitution of N-methylol groups on a proportion of the amido nitrogen atoms in the following manner:

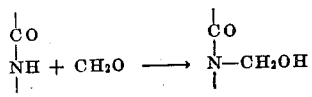

These substituted polyamides are more soluble in alcohol and in other simple solvents than are the initial polyamides and are particularly advantageous in that the N-methylol polyamides can be applied from such solutions and the polymers then insolubilized. The presence of these methylol groups not only increases the solubility of the polyamides but it also introduces reactive groups which are then available for subsequent reaction by which the polyamides may be further modified in physical properties and chemical behavior.

This invention has as an object a new and valuable catalytic method for obtaining N-methylol polyamides. A further object is a method for this purpose by means of which the exact degree of substitution desired can be obtained, and which is capable of producing a degree of substitution which is practically as high as is theoretically possible. A still further object is a method for making N-methylol polyamides which avoids the necessity of critical control of the reaction to prevent gelation prior to isolation of the polymer. Other objects will appear hereinafter.

The above objects are accomplished by heating to reaction temperature, formaldehyde and a polyamide containing hydrogen-bearing amide groups in contact with a liquid which comprises a basic material and which is substantially inert toward the polyamide. This liquid can consist of an inert organic liquid, containing in solution, suspension or otherwise a basic material, or the basic material itself can be a liquid, as for example, a tertiary amine.

The present reaction is carried out in basic medium which in water provides a solution having a pH of at least 8.5. The basic materials particularly suitable for use with inert organic liquids are compounds containing alkali or alkaline earth cations. Examples of these compounds in addition to sodium and potassium carbonate, which are most advantageously used, are sodium borate and the hydroxides of sodium, potassium and barium. In the case of the stronger bases of this kind, the reaction is best carried out under substantially anhydrous conditions to guard against hydrolysis of the N-methylol polyamide.

In the best method for carrying out the reaction a mixture of approximately equal parts of a fiber-forming polyamide and formaldehyde is placed in a pressure vessel with several parts of the basic reaction medium which can consist of the liquid organic base, or of an inert solvent, such as chloroform, containing a small percentage of basic material. When the basic material is a liquid organic base, which may be either a solvent or diluent, the amount or concentration is not particularly important and can vary over wide limits. With inorganic basic catalysts the best results are obtained by using amounts of from 0.1 to 10% by weight of the polyamide. The preferred ratio of polyamide to formaldehyde to diluent to inorganic catalyst is in the range of 1:1:3:0.01, with variations in this ratio, particularly of formaldehyde, altering the degree of substitution. The degree of substitution may also be controlled by the inclusion of small amounts of water. The closed vessel charged as indicated above is then heated with stirring or shaking to a temperature of from 100° to 160° C., and preferably from 130° to 140° C.

The invention is illustrated more fully by the following examples in which the amounts unless otherwise specified are expressed as parts by weight.

Example I

A mixture of 100 parts fiber-forming polyhexamethylene adipamide of 40 mesh screenings, 110 parts of paraformaldehyde, and 300 parts of pyridine were placed in a pressure bomb of such size that the tube was filled to half its capacity. The tube was sealed and heated during the course of about 30 minutes to a temperature of 130° C. under the pressure developed in the tube. The heating was then continued an additional 30 minutes at 130°–140° C. Throughout the heating period the tube was shaken. The reaction vessel was then cooled and opened, and the product, a clear, thin syrup, was diluted with ethanol and poured into water. This caused the N-methylol polyhexamethylene adipamide to separarate as a soft precipitate. The precipitate was redissolved in ethanol and reprecipitated in water. After being dried the resultant precipitate was found to have a methylol content of 13.8% which corresponds to 61% substitution of the original amide groups in the polyamide.

The product was a soft rubbery material which was very soluble in aqueous alcohols, and could be easily worked on conventional rubber equipment. It could be molded under pressure to yield clear, tough, pliable forms.

A solution of 30 parts of the N-methylol polyamide in 50 parts ethanol and 20 parts water was prepared by warming to 60° C. A portion of this solution was cast onto a glass plate, and heated at 100° for one hour to form a clear tough film which was insoluble in ethanol, but soluble in cresol. This indicated that the greater portion of the methylol groups had been removed. To the remainder of the solution was now added 0.5 part maleic acid, and a film was prepared in the same manner. This film was insoluble in both ethanol and cresol, indicating that a portion of the methylol groups had been caused to form methylene cross-linking bridges between amide chains.

The surfaces of two strips of wood were coated from the same solution, i. e. the solution containing maleic acid, and the coated faces were pressed together under 50 pounds pressure for one hour at 120° C. The resulting seal was extremely strong, and was not weakened by the action of boiling water for one hour.

Example II

A mixture of 100 parts of polyhexamethylene adipamide having an intrinsic viscosity of 1.0 of 40 mesh screenings, 100 parts paraformaldehyde, 300 parts chloroform, and 1 part of anhydrous sodium carbonate were mixed in a pressure bomb, which was sealed and heated to 130° C. and maintained between 130° and 135° for 30 minutes. The product of the reaction was a soft paste which readily dissolved in ethanol and was isolated in the manner of Example I. The methylol polyamide contained 10.5% formaldehyde present as methylol which corresponds to 44% substitution of the original amide groups. It exhibited properties similar to those described in Example I.

Example III

Five parts of an interpolymer, prepared from 30% hexamethylenediammonium adipate and 70% hexamethylenediammonium sebacate, and 0.5 part of anhydrous potassium carbonate were mixed in 45 parts of dimethylformamide. The mixture was heated with stirring at 125° C., and 4.6 parts of paraformaldehyde was added over a period of 1 hour. Effervescence occurred during the addition of the paraformaldehyde. At the end of one hour the mixture was cooled and the reaction product was isolated by pouring into an excess of acetone. The dry polymer was found to be soluble in hot ethanol to the extent of 5%. Analysis indicated that approximately 1% of the amide groups had been substituted with methylol groups.

Example IV

One hundred parts of 40 mesh screenings of polyhexamethylene adipamide, 100 parts of paraformaldehyde, 400 parts of xylene, and 1 part of anhydrous potassium carbonate were mixed in a pressure vessel, heated to 130° C., maintained at 130°–135° for 45 minutes. The reaction product consisted of a soft mass of reacted polymer which was swollen by, but insoluble in, the xylene diluent. This mixture was dissolved in ethanol and precipitated into water as in Example I. The methylol content was 9.2%, which corresponds to 35% substitution on the amide nitrogens.

Example V

One hundred parts of polyhexamethylene adipamide of 40 mesh screenings, 125 parts of paraformaldehyde, 300 parts pyridine, and 24 parts of water were reacted in a pressure vessel in the same manner as in Example I. The reaction product was isolated in the same manner. It was found to contain 10.3% methylol, which corresponds to 43% substitution of the original amide groups. The product was similar in properties to the N-methylol polyamide described in Example I.

The present process is also useful for the preparation of highly substituted N-methylol polyamides from low substituted N-methylol polyamides obtained by other methods. This application of the invention is shown by the following example.

Example VI

Fifty parts of N-methylol polyhexamethylene adipamide containing 4.8% methylol, 75 parts paraformaldehyde, 14 parts pyridine, 400 parts dimethylformamide, and 1 part of barium hydroxide were mixed and heated in an open flask at 115° C. for 35 minutes. The solution was then poured into acetone in which a precipitate was formed. This precipitate was dissolved in ethanol and reprecipitated into acetone. It was found to contain 6.9% methylol, an increase of 2.1% over that originally present. It was softer and more elastic than the original N-methylol polyamide.

The dibasic carboxylic acids, diamines, monoaminomonocarboxylic acids, and monoaminomonohydric alcohols used in making the initial polyamides which are further treated by the present process include, in addition to the usual type of reactants, those in which the carbon chain separating the functional groups is interrupted by one or more heterogeneous atoms, such as oxygen, sulfur, or a tert.-nitrogen atom. Examples of reactants which can be used in preparing the polyamides are dibasic carboxylic acids, such as glutaric, adipic, pimelic, suberic, azelaic, sebacic, carbonic, 1,2-cyclohexenediacetic, paraphenylenediacetic, and diglycolic acids; diamines, such as ethylenediamine, tetramethylenediamine, pentamethylenediamine, hexamethylenediamine, octamethylenediamine, decamethylenediamine, meta-phenylenediamine, p-xylylenediamine, β,β'-diaminodiethyl sulfide, and triglycoldiamine; primary monoaminomonocarboxylic acids, such as 6-aminocaproic, 7-aminoheptoic, 12-aminostearic, and 4-aminocyclohexylcarboxylic acids; and primary monoaminomonohydric alcohols, such as ethanolamine, and 4-aminobutyl alcohol. Interpolyamides can be used in the practice of this invention. The interpolyamides are obtained from a mixture of polyamide-forming compositions, e. g. from a mixture of two diprimary diamines with one or more dibasic carboxylic acids or from a mixture of a diprimary diamine and a dibasic carboxylic acid with a polymerizable monoaminomonocarboxylic acid. The polyamides include also polymers obtained by reacting a polyamide-forming composition with another polymer-forming composition, e. g. a polyester-forming composition. Although the invention is most advantageously applied to alcohol-insoluble polyamides which are thereby made alcohol soluble, polyamides initially soluble in alcoholic solvents can also be treated by the present process. Polyamides which do not contain a hydrogen-bearing amide nitrogen atom are excluded. However, polyamides which contain both non-hydrogen-bearing amide groups and hydrogen-bearing amide groups, e. g. a polyamide derived from a dibasic carboxylic acid, a diprimary diamine, and a disecondary diamine, can be used. The polyamides used in the practice of this invention are the high molecular weight or fiber-forming polyamides, namely, those having an intrinsic viscosity above 0.4.

The diluent in which the preparation from the above polyamides of N-methylol polyamides is carried out may be a solvent for the polyamide or interpolymer amide, a solvent for the methylol polyamide, or it may have little or no solvent action at all. In general, any inert, neutral, organic liquid which will not hydrolyze the polyamide or the N-methylol polyamide at the temperatures used can serve as a diluent. Diluents which act as solvents generally increase the ease or degree of reaction. Examples of diluents which may be used are dimethylformamide, chloroform, dioxane, methylene dichloride, ethylene dichloride, dioxolane, benzene, toluene, xylene, chlorobenzene, and carbon tetrachloride. As previously mentioned various liquid organic bases which are inert toward the polyamide can be used as the basic catalyst and may serve also as diluents. Additional organic liquids of this kind are quinoline, dimethylaniline, and triethylamine.

Substances other than the reactants, such as substances acting as diluents, partial solvents or impurities within the diluents, may be present without preventing reaction. In fact, the degree of substitution may be exactly controlled by the addition of small amounts of certain substances containing active hydrogen atoms such as water or alcohols, as these have an inhibitory effect upon the reaction without entering into combination with the polyamide. This serves as additional control over the progress of the reaction.

As in other reactions involving formaldehyde, the formaldehyde can be used in several forms, for example, a solution in an inert liquid vehicle, as solid paraformaldehyde, or as one of the various formaldehyde-liberating substances such as trioxane, and various polyoxymethylenes. The term "formaldehyde" as used in the claims is intended to include formaldehyde-liberating materials. Certain impurities may be present in the formaldehyde, such as small amounts of alcohol or water. The amount of formaldehyde may be varied within wide limits, for as little as 5% formaldehyde based on the amount of polymer produces enough substitution to affect the properties of the polyamide. However, in order to obtain a polymer having good solubility characteristics the preferred limits lie within 50–200% formaldehyde, based on the weight of polyamide.

If desired, the invention can be carried out conveniently by adding formaldehyde to a dimethylformamide solution or dispersion of a polyamide or interpolyamide and maintaining the mixture at constant temperature in an open reactor equipped with a stirring device. However, it is more convenient to effect reaction in a closed vessel as there is a smaller loss of formaldehyde by evaporation and a more highly substituted N-methylol polyamide is obtained. In carrying out this invention, it is desirable to select quantities and conditions so that a reaction time of 5–90 minutes is optimum. The optimum time varies largely depending upon the temperature and composition of the reaction mixture and the degree of reaction desired.

The N-methylol polyamides are preferably precipitated by addition to an excess of non-solvent. With N-methylol polyamides of high substitution, water is the preferred precipitant. Acetone, methyl acetate, methyl formate and ethyl acetate may also be used. Other methods of isolation can be used. For example, it is possible to pass the reaction mixture through wash rolls removing diluent and excess formaldehyde by the action of a stream of water, without at any time actually preparing a solution of the N-methylol polyamide. In some cases in which a non-solvent for the reaction product is used as diluent, for example, xylene, the N-methylol polyamide is obtained as a solid gel-like substance and can be directly dissolved in alcohol and a pure N-methylol polyamide precipitated by the addition of water, acetone, etc. In some cases, in which the diluent serves as a solvent for the N-methylol polyamide, it is possible to utilize the reaction mixture itself, without precipitation and isolation, as the medium for subsequent application of the polyamide, as for instance, in the use of an adhesive or for the formation of fibers by wet or dry spinning techniques.

N-methylol polyamides are readily soluble in aqueous ethanol forming up to 60% solutions in ethanol/water mixtures containing from 60–90 parts of ethanol and 40–10 parts of water. They are also readily soluble in aqueous methanol, normal propanol, isopropanol, isobutanol, ethylene glycol, and in pyridine/water mixtures of high pyridine content.

Advantages of the process of this invention over the process for the preparation of N-methylol polyamides in acid medium are: The process is freer from side reactions and as a result products of higher substitution can be obtained; the reaction mixture shows much less tendency to gel; the reaction is easier to control, variations in temperature and time of reaction being less critical; the presence of alcohols, e. g. as impurities in the reagents, does not lead to the formation of N-alkoxymethyl polyamides as by-products; the unconsumed reagents are more easily recovered; and the reaction mixture is less corrosive.

The substituted N-methylol polamides obtained by the practice of this invention, in addition to being useful generally in applications where solubility in simple solvents is desirable, are of particular value by reason of their high degree of methylol substitution which results not only in enhanced utility but also adapts them to entirely new uses. For example, the highly substituted N-methylol polyamides can easily be molded by impression or injection techniques into a variety of forms, which by virtue of their thermosetting properties can then be made insoluble and essentially infusible. They are also easily compounded and shaped on conventional rubber equipment. Films, fibers, bristles, tubes, ribbons, sheets and like articles can be prepared from these N-methylol polyamides either by formation from alcoholic solution or by suitable shaping of the dry polymer. In some instances, for example, those in which N-methylol polyamide is prepared in a pyridine medium, it is possible to form these articles directly from the reaction mixture without the necessity of isolation.

N-methylol polyamides can also be mixed with a variety of substances and then treated in any of the above manners. For instance, they can be extended with various substances such as carbon black, wood flour, ground leather, clay or mica or they can be plasticized with various materials such as methyl 10-phenylol-stearate and N-alkyl-paratoluenesulfonamides. They can also be mixed with various resins, such as urea-formaldehyde, phenolformaldehyde and diphenylolpropane-formaldehyde resins, or with pigments, rubber, synthetic rubbers, cellulose derivatives and other modifying agents. With certain of these substances mixture is purely mechanical whereas with others, such as those containing available hyroxyl groups or other active hydrogens, there may be actual chemical interaction with a splitting out of water. In such cases N-methylol polyamides serve as cross-linking agents.

N-methylol polyamides or interpolyamides, alone, or in admixtures with other ingredients can be used as coating compositions for fabrics, films, metals, paper and wood. In particular their use as adhesives is important. Thus, N-methylol polyhexamethylene adipamide can be used to laminate various substances, including wood, paper, nylon, rubber, polyvinyl alcohol, and polyvinyl acetals. Although insolubility can be caused by heat alone, the presence of small amounts of acids, such as formic, adipic, maleic, oxalic, phosphoric and para-toluenesulfonic acids, followed by heat or pressure treatment causes cross-linking between adjacent polyamide chains and the bonded material, resulting in bonds of exceptional strength and resistance to water, alcohol and other solvents. Heating treatments as low as 80° C. for one hour or at higher temperatures for shorter periods cause setting of the bond.

As many apparently widely different embodiments of this invention may be made without departing from the spirit and scope thereof, it is to be understood that I do not limit myself to the specific embodiments thereof except as defined in the appended claims.

I claim:

1. A process for making N-methylol polyamides which comprises heating to reaction temperature formaldehyde and a fiber-forming polycarbonamide containing hydrogen-bearing amide groups as an integral part of the polymer chain in contact with a basic liquid reaction medium which comprises organic liquid and in which basic material is present in amount of at least 0.1%, by weight of said polycarbonamide, said basic liquid reaction medium having a pH of at least 8.5 and, being inert toward said polycarbonamide, the formaldehyde being present during the reaction in amount of at least 5% by weight of said polycarbonamide and said reaction being conducted throughout in the presence of said basic liquid reaction medium at said pH value, and continuing the reaction until a substantial amount of the hydrogen-bearing amide groups have been converted into N-methylol groups, said fiber-forming polycarbonamide being the reaction product of a linear polymer-forming composition comprising polyamide-forming material selected from the group consisting of (a) monoaminocarboxylic acids, (b) mixtures of diamine with dibasic carboxylic acid, and (c) mixtures of monoaminomonohydric alcohol with dibasic carboxylic acid.

2. The process set forth in claim 1 in which said polyamide containing hydrogen-bearing amide groups is polyhexamethylene adipamide.

3. The process set forth in claim 1 in which the heating is carried out at a temperature of from 100° C. to 160° C. under superatmospheric pressure.

4. The process set forth in claim 1 in which the heating is carried out at a temperature of from 100° C. to 160° C., and in which the formaldehyde is present in the reaction medium in amount of from 50% to 200% by weight of said polycarbonamide.

WILLIAM WAY WATKINS.

REFERENCES CITED

The following references are of record in the file of this patent:

UNITED STATES PATENTS

| Number | Name | Date |
|---|---|---|
| 2,096,181 | Jahrstorfer et al. | Oct. 19, 1937 |
| 2,173,005 | Strain | Sept. 12, 1939 |
| 2,239,440 | D'Alelio | Apr. 22, 1941 |
| 2,244,184 | Austin et al. | June 3, 1941 |
| 2,288,279 | Hopff et al. | June 30, 1942 |
| 2,317,181 | D'Alelio | Apr. 20, 1943 |